J. G. PERRY, Hay-Spreading Machine

97438

PATENTED
NOV 30 1869

Witnesses:
Jo. E. Peyton
Baltis DeLong

Inventor.
J. G. Perry
per Wm. D. Baldwin
Atty

UNITED STATES PATENT OFFICE.

JOHN G. PERRY, OF KINGSTON, RHODE ISLAND.

IMPROVED HAY-TEDDER.

Specification forming part of Letters Patent No. 97,438, dated November 30, 1869.

*To all whom it may concern:*

Be it known that I, JOHN G. PERRY, of Kingston, in the county of Washington and State of Rhode Island, have invented certain new and useful Improvements in Hay-Spreading Machines, of which the following is a full, clear, and exact description, reference being had to the accompanying drawings, which make part of this specification, and in which—

Figure 1:
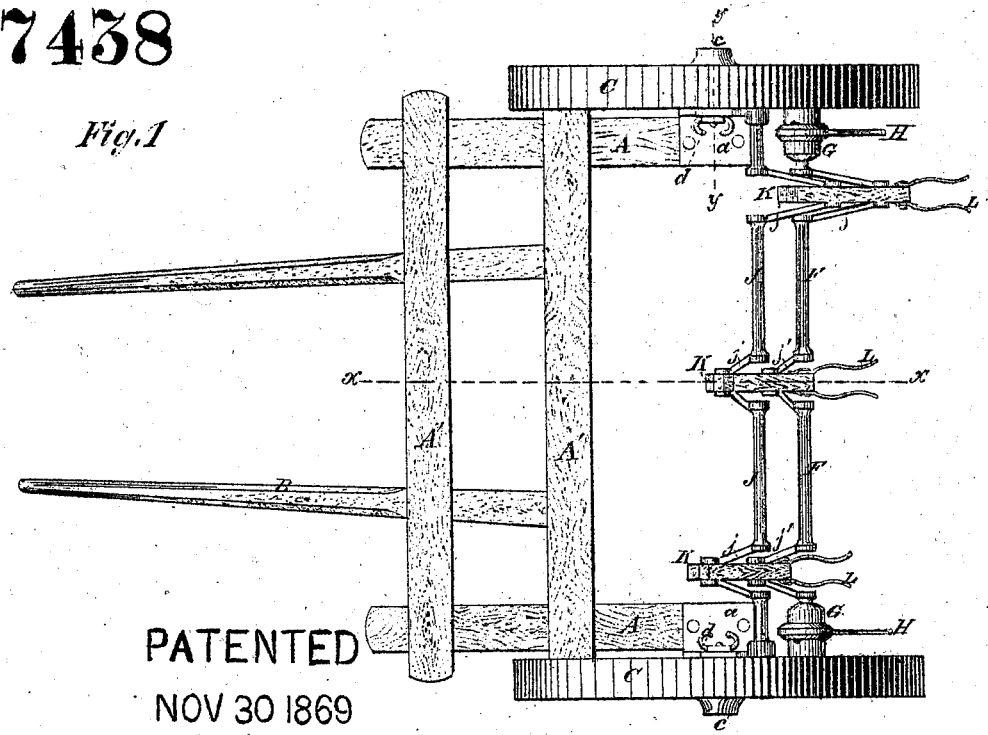
Figure 3:
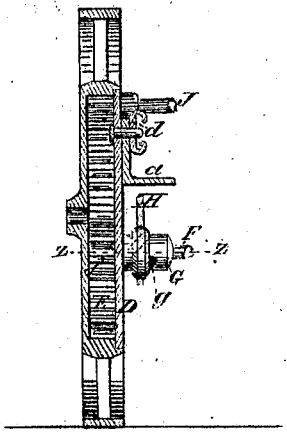
Figure 2:
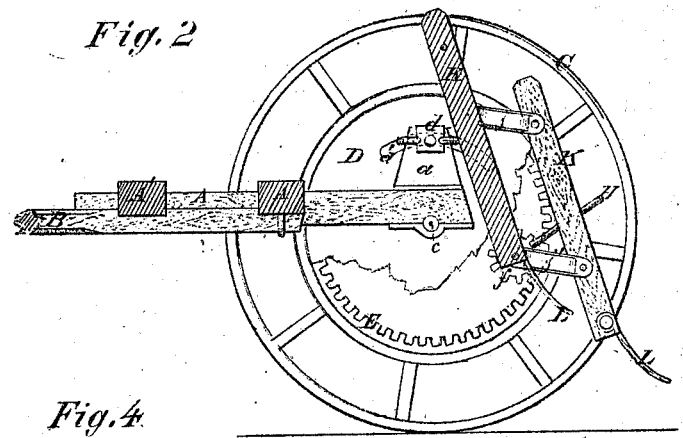
Figure 4:
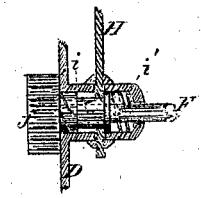

Figure 1 is a plan or top view of my improved machine; Fig. 2, a vertical longitudinal section through the same at the line $x\ x$ of Fig. 1; Fig. 3, a vertical central transverse section through one of the driving-wheels at the line $y\ y$ of Fig. 1; and Fig. 4, a section through the crank-shaft coupling-box at the line $z\ z$ of Fig. 3, showing the apparatus for throwing the crank-shaft into or out of gear.

My invention relates to that class of hay-spreaders in which the teeth have an eccentric pushing movement while acting on the crop instead of a simple rotary movement around their axis; and the objects of the improvements hereinafter claimed are, first, to impart the proper pushing and retracting movements to the teeth, by mounting them on stocks connecting two parallel revolving cranked axles; second, to provide for the adjustment of these cranks, by mounting them in parallel disks, adjustable on the main frame; third, to provide for the stopping or starting of the teeth by mounting shifting-clutches on the adjustable disks; and, fourth, to protect the gearing from clogging, by inclosing it between the driving-wheels and the adjustable disks, which support the crank-shafts.

In the accompanying drawings, in which all my improvements are shown as embodied in one machine, a main frame is shown as consisting of two parallel longitudinal side pieces, A, connected by cross-pieces A'. Shafts or thills B project from the front of this frame.

The side pieces A extend backward, and have lugs or flanged plates $a$ secured upon their rear ends. The axles $c$ of the driving-wheels C C' are also mounted on these beams. Disks D, capable of turning on these axles, are arranged outside the side pieces A and parallel to each other.

Thumb-screws $d$, passing through the lugs $a$, enter slots $d'$, Fig. 2, in the disks D, these slots being curved concentrically with the axles $c$.

The driving-wheels have hollow hubs or recesses formed in them to receive internally-geared spur-wheels E, and when in place the inner sides of these recesses are closed by the disks D, thus securely protecting the gearing.

The spur-wheels E drive corresponding pinions $f$, turning loosely on a crank-shaft, F, with which they are connected by ratchets of well-known form. These pinions are thrown into or out of gear with the crank-shaft F by means of tubular studs G, cast on the disks and provided with diagonal slots $g$, through which shipping-levers H pass. These levers bear against collars on sliding sleeves $i$, Fig. 4, carrying ratchet-teeth matching those of the pinions.

Spiral springs $i'$ on the crank-shaft F keep these ratchets in gear when they are not pressed apart by the levers H. (See Figs. 1, 3, and 4.) I am thus enabled to use either or both wheels as drivers, or to disconnect both at pleasure, and to adjust the teeth, crank-shafts, and disks, without deranging the relation of these parts.

The upper crank-shaft, J, turns in suitable bearings in the disks D. The two shafts F J have corresponding cranks $j\ j'$, and these cranks are connected in pairs by stocks K, which carry teeth or forks L, of any proper well-known form, at their lower ends.

In operation, as the wheels revolve, the gearing rotates the crank-shaft F, which imparts a rotating rising-and-falling motion to the teeth, causing the stocks K to move in planes always parallel to themselves, provided all the cranks $j\ j'$ be of equal length.

By turning the disks D backward or forward I am enabled to raise or lower the teeth, and also to vary their movement; for, as they are lowered, the two crank-shafts approach more closely a common vertical plane, and thus give a greater horizontal range of movement to the tooth, while, when the teeth are raised, an opposite result is produced. The thumb-screws hold the disks in any desired position.

As the crank-shafts are mounted on the disks, which, in turn, are mounted on the main axle, the working of the gearing remains unimpeded by these changes.

I am aware that a cranked axle carrying teeth is old, as well as inclosing gearing to protect it from dirt, and do not, therefore, broadly claim such devices; but I am unaware of the use, prior to my invention, of two parallel revolving cranked axles connected by the stock of the teeth and mounted in adjustable disks inclosing the gearing; neither am I aware of shipping mechanism mounted on such disks.

What I claim as my invention, and desire to secure by Letters Patent, is—

1. The combination of two parallel rotating cranked shafts with stocks carrying the rake-teeth, all constructed to operate substantially as set forth.

2. The combination of the stocks and their parallel cranked shafts with the adjustable disks mounted on the axles of the driving-wheels, all these parts being constructed for joint operation, as set forth.

3. The combination of the adjustable disks, the crank-shaft F, and the shipping mechanism, mounted on the disks, and constructed as set forth.

4. The combination of the recessed driving-wheels, the gearing, the adjustable disks, and the cranked shaft F, all these parts being constructed and operating as set forth.

JOHN G. PERRY.

Witnesses:
ELISHA C. CLARKE,
HENRY T. BRAMAN.